(12) United States Patent
Nozawa et al.

(10) Patent No.: US 7,322,814 B2
(45) Date of Patent: Jan. 29, 2008

(54) FILM OR SHEET FORMING APPARATUS

(75) Inventors: Kenji Nozawa, Numazu (JP);
Takayoshi Sano, Fuji (JP)

(73) Assignee: Toshiba Machine Co., Ltd., Tokyo (JP)

( * ) Notice: Subject to any disclaimer, the term of this patent is extended or adjusted under 35 U.S.C. 154(b) by 226 days.

(21) Appl. No.: 10/875,219

(22) Filed: Jun. 25, 2004

(65) Prior Publication Data

US 2004/0265411 A1 Dec. 30, 2004

(30) Foreign Application Priority Data

Jun. 27, 2003 (JP) ............................ P2003-185326

(51) Int. Cl.
*B29C 41/26* (2006.01)
*B29C 41/46* (2006.01)
*B29C 47/88* (2006.01)

(52) U.S. Cl. ...................................... 425/325; 425/224

(58) Field of Classification Search ................ 425/325, 425/75, 224

See application file for complete search history.

(56) References Cited

U.S. PATENT DOCUMENTS

| | | | | |
|---|---|---|---|---|
| 2,974,364 A | * | 3/1961 | Lambert et al. | ............. 264/213 |
| 3,141,194 A | * | 7/1964 | Jester | ........................ 425/404 |
| 3,157,723 A | * | 11/1964 | Hochberg | .................. 264/284 |
| 3,159,696 A | * | 12/1964 | Hodgson, Jr. | ............... 264/556 |
| 3,223,757 A | * | 12/1965 | Owens et al. | ................ 264/467 |
| 3,423,493 A | * | 1/1969 | Klenk et al. | ................. 264/556 |
| 3,502,757 A | * | 3/1970 | Spencer | ...................... 264/556 |
| 3,847,516 A | * | 11/1974 | Hoffman | ..................... 425/72.1 |
| 3,904,725 A | * | 9/1975 | Husky et al. | ............... 264/556 |
| 4,421,709 A | * | 12/1983 | Steinberg | .................... 264/216 |
| 4,605,366 A | * | 8/1986 | Lehmann et al. | ........... 425/143 |
| 4,610,617 A | * | 9/1986 | Christ et al. | ................ 425/143 |
| 4,676,851 A | * | 6/1987 | Scheibner et al. | ............ 156/66 |
| 4,803,027 A | | 2/1989 | Peiffer et al. | |

(Continued)

FOREIGN PATENT DOCUMENTS

DE 1 254 856 5/1968

(Continued)

OTHER PUBLICATIONS

Official Action dated Dec. 19, 2005, Issued by German Patent and Trademark Office in corresponding German Patent Application (Official File No. 10 2004 030 823.3).

(Continued)

*Primary Examiner*—Yogendra N. Gupta
*Assistant Examiner*—Dimple N. Bodawala
(74) *Attorney, Agent, or Firm*—Finnegan, Henderson, Farabow, Garrett & Dunner, L.L.P.

(57) ABSTRACT

To form a film or sheet relatively thin and needing a high degree of precision in thickness, such as for an optical use, while suppressing temperature fluctuations at one side opposite to the other side in contact with an outer peripheral surface of a roll (11), an outer peripheral surface of the roll is covered, with a necessary gap (t) left, by a windshield (20) of a double-layered structure having a thermally insulating property.

5 Claims, 2 Drawing Sheets

U.S. PATENT DOCUMENTS

| | | | | |
|---|---|---|---|---|
| 5,057,259 | A | * | 10/1991 | Parmelee .................... 264/166 |
| 5,091,134 | A | * | 2/1992 | Oshima et al. .......... 264/176.1 |
| 5,320,787 | A | * | 6/1994 | Hayashi et al. ............ 264/1.33 |
| 5,972,280 | A | * | 10/1999 | Hoagland .................... 264/555 |
| 6,071,110 | A | * | 6/2000 | Mikkelsen .................. 425/327 |
| 6,152,720 | A | * | 11/2000 | Greb et al. ................ 425/147 |
| 6,619,941 | B1 | * | 9/2003 | Smith et al. ............... 425/72.1 |
| 6,790,404 | B2 | * | 9/2004 | Yapel et al. ................ 264/466 |
| 6,994,533 | B2 | * | 2/2006 | Yapel et al. .................. 425/75 |
| 7,018,187 | B2 | * | 3/2006 | Meyer ....................... 425/72.1 |
| 2002/0036362 | A1 | * | 3/2002 | Chigira et al. ............. 264/40.6 |
| 2002/0135087 | A1 | | 9/2002 | Yapel et al. |
| 2003/0041957 | A1 | * | 3/2003 | Harvey et al. ......... 156/244.27 |

FOREIGN PATENT DOCUMENTS

| | | |
|---|---|---|
| DE | 3 620 219 | 12/1987 |
| JP | 59133018 A | 7/1984 |
| JP | 59196223 A | 11/1984 |
| JP | 2001-300957 | 10/2001 |
| JP | 2002-036333 | 2/2002 |

OTHER PUBLICATIONS

Notification of Reasons for Refusal dated Jan. 21, 2006, issued by Korean Patent Office in corresponding Korean Patent Application No. 10-2004-0048252.

* cited by examiner

FILM OR SHEET FORMING APPARATUS

BACKGROUND OF THE INVENTION

1. Field of the Invention

The present invention relates to a film or sheet forming apparatus, and particularly, to a film or sheet forming apparatus for film or sheets relatively thin and needing a high degree of precision in thickness, such as for an optical use.

2. Relevant Art

The film or sheet forming apparatus for films or sheets relatively thin and needing a high degree of precision in thickness, such as for an optical use, is typically installed in a clean room, and configured such that a resin delivered from a die which holds molten resin is received simply with an outer peripheral surface of a resin receiving roll, and the roll is driven to rotate about its central axis, so that the resin is fed to be guided by the outer peripheral surface of the roll, while being cooled to an adequate state of solid phase, whereby a film or sheet is formed.

In other words, this type of film or sheet forming apparatus has a roll which is driven for rotation about its own central axis, and an outer peripheral surface of the roll is given a resin from a die, which resin is cooled with the outer peripheral surface of roll to form a film or sheet.

In order to provide the film or sheet with a maintained thickness precision, various measures have been devised.

For instance, a formation starting point (as an angular position) where the resin from the die is brought into contact on the roll outer peripheral surface is stabilized in its transverse direction by appropriate techniques (e.g. air knife method, width pinning method, edge pinning method, edge blasting method) to prevent the cooling by roll from varying.

Further, a compartment is provided to accommodate the forming apparatus with a die inclusive, and a door or curtain is furnished for entry or exit of worker thereto, so that the formation of film or sheet is free from influences of air conditioning in the clean room.

SUMMARY OF THE INVENTION

By employment of techniques for stabilizing the formation starting point, the condition of contact between resin and roll outer peripheral surface is equalized in the transverse direction of film or sheet. Since the roll is temperature-controlled with a coolant, also at that side of resin which is cooled by the roll outer peripheral surface, i.e. at "one resin surface side contacting on the roll" (hereafter sometimes called "back side"), the cooling is equalized in the transverse direction.

However, the other side to be natural-cooled by heat dissipation to the ambient air, i.e. "that resin surface side which does not contact on the roll" (hereafter sometimes called "front side"), remains exposed to local fluctuations in physical condition of the ambient air (for example, air stream or temperature variations unevenly distributed in the transverse or longitudinal direction of resin).

At the front side of resin, therefore, it is difficult to keep, for example, the temperature change of ambient air within an error range (±0.5° C. or less) in which an optical film or optical sheet applicable to optical apparatus can be formed. As a result, in coping with an increased degree of thickness precision (about 1 to 3 μm) such as by miniaturization of objective apparatus, it is unsuccessful to achieve a good efficiency, i.e. a relatively high yield.

The present invention has been made with this point in view. It therefore is an object of the invention to provide a film or sheet forming apparatus that allows, at a relatively high yield, the formation of a film or sheet relatively thin and needing a high degree of precision in thickness, such as for an optical use.

To achieve the object, according to an aspect of the invention, a film or sheet forming apparatus is provided with a roll driven to rotate about an own central axis, and configured to have a resin given from a die to an outer peripheral surface of the roll, and cool the resin with the outer peripheral surface of the roll to form a film or sheet, and comprises an ambient air equalizer configured to equalize a physical condition of ambient air in a vicinity at a front side of the resin.

According to the aspect of the invention, in the vicinity at the front side of the resin, the physical condition of ambient air (for example, air stream or temperature) is equalized, thus getting free of local fluctuations, thereby allowing, at a relatively high yield, the formation of a film or sheet relatively thin and needing a high degree of precision in thickness, such as for an optical use.

The ambient air equalizer may preferably comprise a thermally insulating windshield configured to cover the outer peripheral surface of the roll, with a necessary gap kept therebetween for formation of the film or sheet, and more preferably, the windshield should comprise a double-layered structure having a thermally insulating interlayer. In the film or sheet forming apparatus according to this preferable aspect of the invention, by provision of the windshield configured to cover the outer peripheral surface of the roll with a necessary gap for formation of the film or sheet, there is given a wind shielding effect, whereby the resin on the outer peripheral surface of the roll is kept from exposure to unstable air streams. Moreover, since the windshield has a thermally insulating property, the temperature of the air gap (chamber) between the windshield and the outer peripheral surface of the roll is kept, by the thermally insulating property of the windshield, from being influenced by ambient temperature, so that the chamber temperature (gap temperature) is free of fluctuations due to ambient temperature.

This allows temperature variations, on the opposite side (front side) to that side (back side) of the resin which contacts on the outer peripheral surface of the roll, to be controlled within a required range (±0.5° C. or less) for formation of an optical film or optical sheet, and enables the formation of a resin film or sheet with such a high degree of thickness precision as required for the optical film or optical sheet.

The ambient air equalizer may preferably comprise a windshield configured to cover the outer peripheral surface of the roll, with a necessary gap kept therebetween for formation of the film or sheet, the windshield having a thermal medium circuit. In the film or sheet forming apparatus according to this preferable aspect of the invention, by provision of the windshield configured to cover the outer peripheral surface of the roll with a necessary gap for formation of the film or sheet, there is given a wind shielding effect, whereby the resin on the outer peripheral surface of the roll is kept from exposure to unstable air streams. Moreover, since the windshield has the thermal medium circuit, a temperature-controlled thermal medium can be conducted through the circuit, to thereby keep the temperature of the air gap (chamber) between the windshield and the outer peripheral surface of the roll within a desirable range, and free of fluctuations due to ambient temperature.

This allows temperature variations, on the opposite side to that side of the resin which contacts on the outer peripheral surface of the roll, to be controlled within a required range (±0.5° C. or less) for formation of an optical film or optical sheet, and enables the formation of a resin film or sheet with such a high degree of thickness precision as required for the optical film or optical sheet.

The windshield may preferably be configured to cover the outer peripheral surface of the roll between a rotational position of the roll confronting an outlet of the die and a rotational position of the roll having the resin rendered in a predetermined solid state.

The windshield may preferably be configured to move between an advance position (wind shielding position) to cover the outer peripheral surface of the roll, with the necessary gap for formation of the film or sheet, and a retreat position (refuge position) for a retreat from the advance position.

The above and further objects, features, and advantages of the invention will be fully apparent from the following detailed description of the preferred embodiments, when the same is read in conjunction with the accompanying drawings.

BRIEF DESCRIPTION OF THE ACCOMPANYING DRAWINGS

DETAILED DESCRIPTION OF THE PREFERRED EMBODIMENTS

Preferred embodiments of the present invention will be detailed below with reference to the accompanying drawings.

First Embodiment

Figure 1:
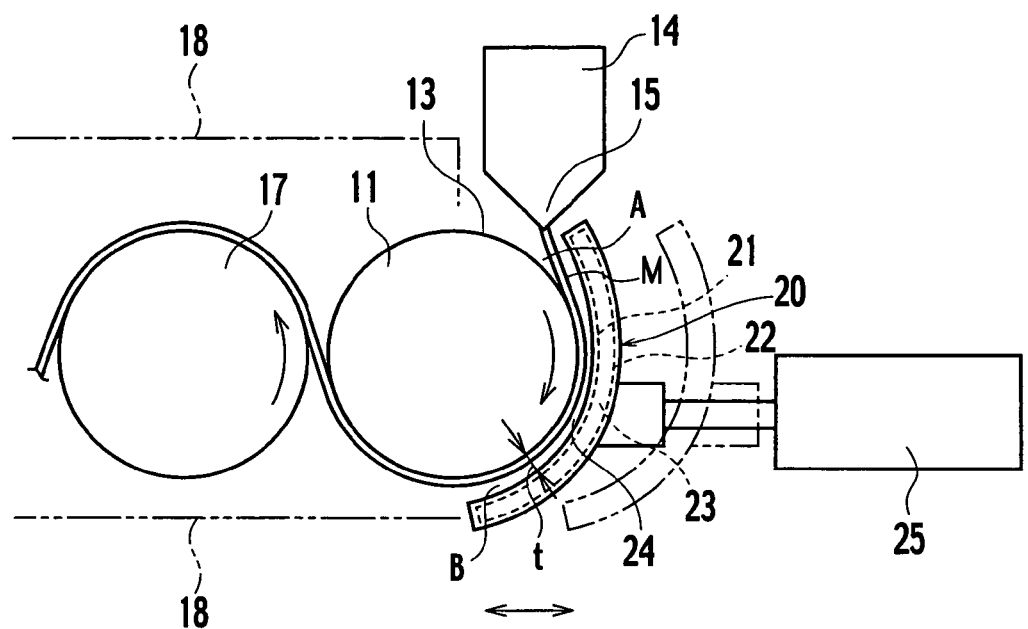
FIG. 1 is a side view of a film or sheet forming apparatus as a first embodiment of the invention.
Figure 2:
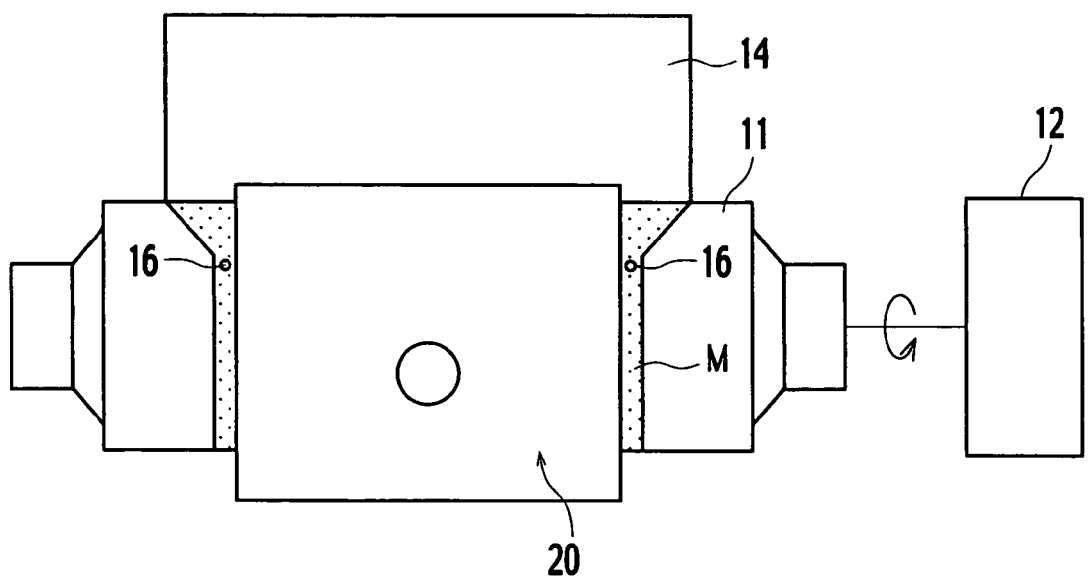
FIG. 2 is a front view of the film or sheet forming apparatus of FIG. 1.

FIGS. 1 and 2 show the first embodiment of a film or sheet forming apparatus according to the invention. The film or sheet forming apparatus includes a first cooling roll (as a resin-receiving casting roll) 11 that is rotatable about its own central axis. The first cooling roll 11 is operatively connected to an electric motor 12, to be driven to rotate about the own central axis at a predetermined constant speed. The rotational direction of the first cooling roll 11 is clockwise as viewed in FIG. 1.

The first cooling roll 11 has a general structure that internally includes cooling water circulation flow passages (not shown) through which cooling water flows to control the temperature such that the temperature of a roll surface, e.g., the temperature of an outer peripheral surface 13 of the roll can be uniformly maintained.

Disposed in an upper area of the first cooling roll 11 is a die 14 that is oriented downward. The die 14 is continuously supplied with molten resin M from an extruder (not shown), so that the resin M flows out from an outlet 15 formed at a lower portion of the die, onto the outer peripheral surface 13 of the roll. Disposed on both sides of the first cooling roll 11 are edge pinning electrodes 16 that are placed in opposition on the outer peripheral surface 13 of the roll.

Resin M is cooled on the roll outer peripheral surface 13 with the first cooling roll 11 rotating at the constant speed and has a predetermined state of solid phase in a lower area B of the first cooling roll 11 to form a film or sheet. The film or sheet is continuously wound on an outer peripheral surface of a second cooling roll 17 and cooled. The first cooling roll 11 and the second cooling roll 17 are surrounded by a wind screen cover 18.

Disposed in an area outside of the first cooling roll 11 is a circular-arc shaped planer windshield 20 (ambient air equalizer) that, as viewed in a rotational direction of the roll, extends between a (upper area) position A, at which the first cooling roll 11 confronts the outlet 15 of the die 14, and a (lower area) position B, at which resin M has the predetermined solid state on the outer peripheral surface 13 of the roll, so that it covers the outer peripheral surface 13 of the roll with a necessary air gap t kept for formation of the film or sheet.

The windshield 20 is connected to a fluid pressure cylinder 25 and arranged to be movable between an advance position, shown by a solid line in FIG. 1, and a retreat position, shown by a double dot line in FIG. 1, which remains retreated from the advance position (operative position for formation).

The windshield 20 takes the form of a closed double-layer structure composed of an inner side plate 21 and an outer side plate 22, each of which is curved in a circular-arc shape, and the enclosed interlayer between the inner side plate 21 and the outer side plate 22 constitutes a heat-insulating air layer 23.

Both the inner side plate 21 and outer side plate 22 take the form of circular-arc shapes concentric with the first cooling roll 11, and in the advance position (operative position), the inner side plate 21 keeps a uniform air gap t with respect to the roll outer peripheral surface 13 over an entire area between the position A and the position B such that a chamber 24 is defined with the uniform air gap t with respect to the roll outer peripheral surface 13.

The air residing in the chamber 24, that is, ambient air in a region vicinal to the front side of resin M has its physical conditions (for example, air stream and temperature) effectively equalized, in particular in the transverse direction, relative to the outside of the windshield 20.

In the structure set forth above, by provision of the windshield 20, which covers the outer peripheral surface 13 of the roll with the air gap t requisite for formation of film or sheet, there is obtained a wind shielding effect, so that the resin M on the outer peripheral surface 13 of the roll is kept from exposure to unstable air streams.

Further, by the windshield 20 configured as a closed double-layer structure with the heat-insulating air layer 23 having a thermally insulating property, the temperature of the chamber 24 between the windshield 20 and the outer peripheral surface 13 of the roll is kept from influences of ambient temperature (atmospheric temperature), and no fluctuations due to the ambient temperature are caused in the temperature (air gap temperature) of chamber 24, which is thus maintained at a constant temperature depending on the temperature of the outer peripheral surface of the roll.

This enables variations in temperature on one side, opposite to the other side in contact with the outer peripheral surface 13 of the roll, to be controlled within a required range (±0.5° C. or less) for formation of an optical film or optical sheet, and resin can be uniformly solidified while being uniformly contracted when changing to a predetermined state of solid phase. Due to these effects, no unevenness occurs in thickness, resulting in a capability of efficiently forming the resin film or sheet with a high degree of thickness precision at an extent requisite for formation of optical film or optical sheet.

When in out of forming service, the windshield 20 can be set back to the retreat position by the fluid pressure cylinder 25. This enables a favorable maintenance capability to be enhanced.

Second Embodiment

Figure 3:
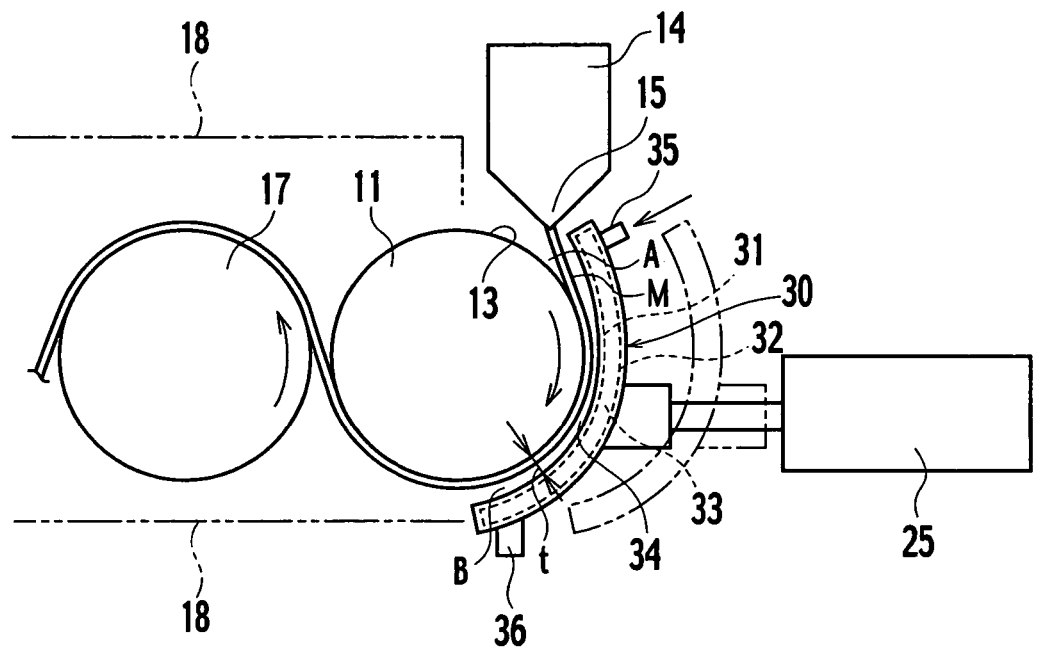
FIG. 3 is a side view of a film or sheet forming apparatus as a second embodiment of the invention.
Figure 4:
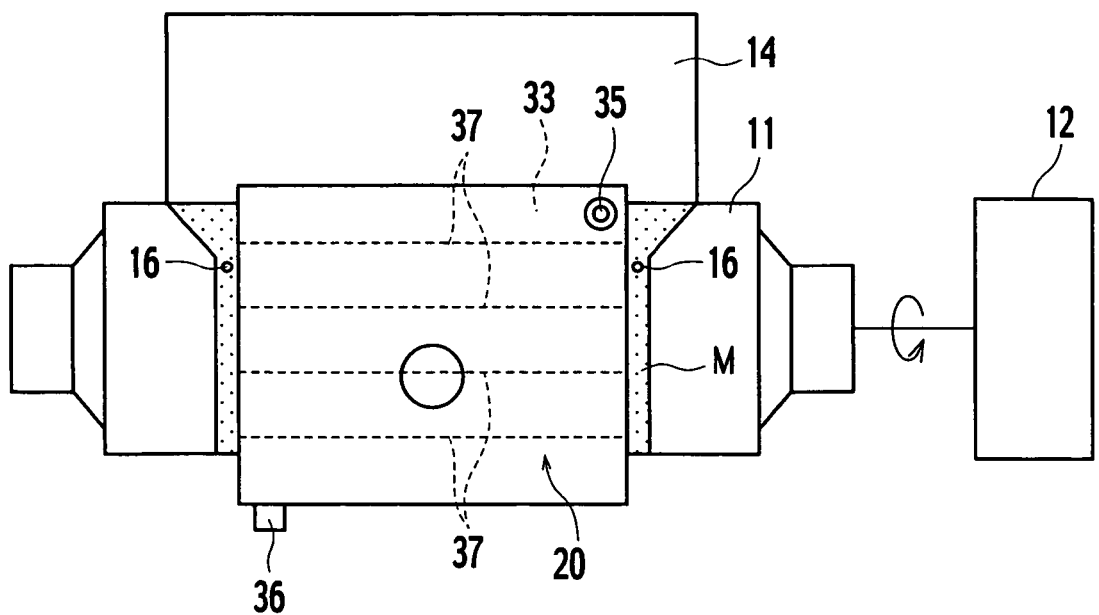
FIG. 4 is a front view of the film or sheet forming apparatus of FIG. 3.

FIGS. 3 and 4 show the second embodiment of a film or sheet forming apparatus according to the invention.

In the second embodiment, a windshield 30 is disposed in an equivalent position to the first embodiment. The windshield 30 is connected to a fluid pressure cylinder 25 and arranged to be movable between a advance position, shown by a solid line in FIG. 3, and a retreat position (refuge position), shown by a double dot line in FIG. 3, as a position for retreat from the advance position (operative position for formation).

The windshield 30 has the form of a closed double-layer structure composed of an inner side plate 31 and an outer side plate 32, each of which is curved in a circular-arc shape, and a fluid channel 33 is formed between the inner side plate 31 and the outer side plate 32, as a circuit to allow thermal medium to flow. Disposed on the outer side plate 32 at an area closer to the position A and an area closer to the position B, respectively, are a thermal medium inlet 35 and a thermal medium outlet 36. Further, disposed between the inner side plate 31 and the outer side plate 32 are baffle plates 33 by which the fluid channel 33 is formed in a meandering shape that meanders over an entire surface of the windshield 30.

Both the inner side plate 31 and outer side plate 32 take the form of circular-arc shapes concentric with the first cooling roll 11, and in the advance position (operative position), the inner side plate 31 maintains the uniform air gap t with respect to the outer peripheral surface 13 of the roll over the entire area between the position A and the position B such that a chamber 34 is defined with the uniform air gap t with respect to the outer peripheral surface 13 of the roll.

The air residing in the chamber 34, that is, ambient air in a region vicinal to the front side of resin M has its physical conditions (for example, air stream and temperature) effectively equalized, in particular in the transverse direction, relative to the outside of the windshield 30.

In the structure set forth above, by provision of the windshield 30, which covers the outer peripheral surface 13 of the roll with the air gap t requisite for formation of film or sheet, there is obtained a wind shielding effect, whereby the resin on the outer peripheral surface 13 of the roll is kept from exposure to unstable air streams.

Further, by the temperature-controlled thermal medium entering from the thermal medium inlet 35 of the windshield 30 into the fluid channel 33 and then flowing out from the thermal medium outlet 36, the temperature over the windshield 30, in particular that of the inner side plate 31, is held at a predetermined temperature depending on the temperature of thermal medium. This allows the temperature of the chamber 34 between the windshield 30 and the outer peripheral surface 13 of the roll to be free from influences of ambient temperature (atmospheric temperature), and no fluctuations are caused due to ambient temperature in the temperature (air gap temperature) of the chamber 34, which is thus kept at a constant temperature depending on temperatures of roll outer peripheral surface and thermal medium.

Also in this embodiment, temperature variations on one side, opposite to the other side in contact with the outer peripheral surface 13 of the roll, are controlled within a required range (±0.5° C. or less) for formation of optical film or optical sheet, and resin can be uniformly solidified while being uniformly contracted when changing to a predetermined state of solid phase. Due to these effects, no unevenness occurs in thickness, resulting in a capability of efficiently forming a resin film or sheet with a high degree of thickness precision at an extent requisite for formation of optical film or optical sheet.

In this embodiment also, when in out of forming service, the windshield 30 can be retreated to the retreat position by the fluid pressure cylinder 25. This enables a favorable maintenance capability to be enhanced.

As will be seen from the foregoing description, a film or sheet forming apparatus according to the present invention allows, at a relatively high yield, the formation of a film or sheet relatively thin and needing a high degree of precision in thickness, such as for an optical use.

Although the preferred embodiments of the invention have been described, such description is for illustrative purposes, and it not restrictive. It will be seen that the artisan can make variations or modifications within the spirit or scope of the following claims.

What is claimed is:

1. A film or sheet forming apparatus provided with a roll driven to rotate about an own central axis, and configured to have a resin given from a die to an outer peripheral surface of the roll, and cool the resin with the outer peripheral surface of the roll to form a film or sheet, the film or sheet forming apparatus comprising:
    an ambient air equalizer configured to equalize a physical condition of ambient air in a vicinity at a front side of the resin, wherein:
        the ambient air equalizer is configured to move between a first position and a second position, and
        the ambient air equalizer includes a double-layered structure that is partially concentric with a surface of the roll, wherein
            the doubled layer structure comprises an inner side plate and an outer side plate, wherein
                the inner side plate and the outer side plate are curved in a circular-arc shape, and
                baffle plates are disposed between the inner side plate and the outer side plate.

2. The film or sheet forming apparatus of claim 1, wherein the ambient air equalizer comprises a thermally insulating windshield configured to cover the outer peripheral surface of the roll while maintaining a gap therebetween for formation of the film or sheet.

3. The film or sheet forming apparatus of claim 2, wherein the windshield is configured to cover a portion of the outer peripheral surface of the roll that receives the resin.

4. The film or sheet forming apparatus of claim 2, wherein the windshield is configured to move between an advance position to cover the outer peripheral surface of the roll while maintaining the gap for formation of the film or sheet, and a retreat position for a retreat from the advance position.

5. The film or sheet forming apparatus of claim 1, wherein a fluid channel is formed between the inner side plate and the outer side plate, providing a circuit to allow thermal medium flow.

* * * * *